United States Patent
Kallio

(10) Patent No.: US 7,640,036 B2
(45) Date of Patent: Dec. 29, 2009

(54) METHOD FOR PERFORMING INTER-SYSTEM HANDOVERS IN A MOBILE COMMUNICATION SYSTEM

(75) Inventor: Juha Kallio, Helsinki (FI)

(73) Assignee: Nokia Siemens Networks Oy, Espoo (FI)

(*) Notice: Subject to any disclaimer, the term of this patent is extended or adjusted under 35 U.S.C. 154(b) by 532 days.

(21) Appl. No.: 11/201,123

(22) Filed: Aug. 11, 2005

(65) Prior Publication Data

US 2006/0258358 A1 Nov. 16, 2006

(30) Foreign Application Priority Data

May 11, 2005 (FI) .................................. 20050500

(51) Int. Cl.
*H04M 1/00* (2006.01)
*H04W 36/00* (2009.01)
(52) U.S. Cl. .................................. 455/552.1; 455/436
(58) Field of Classification Search ........................ None
See application file for complete search history.

(56) References Cited

U.S. PATENT DOCUMENTS

| 6,721,565 | B1 * | 4/2004 | Ejzak et al. .................. 455/436 |
| 2003/0026245 | A1 * | 2/2003 | Ejzak .......................... 370/352 |
| 2003/0027569 | A1 * | 2/2003 | Ejzak .......................... 455/432 |
| 2003/0134650 | A1 | 7/2003 | Sundar et al. |
| 2006/0126565 | A1 * | 6/2006 | Shaheen ...................... 370/331 |
| 2006/0291419 | A1 * | 12/2006 | McConnell et al. ........ 370/331 |

FOREIGN PATENT DOCUMENTS

| WO | WO 2004/082219 A2 | 9/2004 |
| WO | WO 2005/041612 A1 | 5/2005 |
| WO | WO 2005/112410 A2 | 11/2005 |
| WO | WO 2006/040673 A2 | 4/2006 |

OTHER PUBLICATIONS

Zhang, Qian et al., "Efficient Mobility Management for Vertical Handoff between WWAN and WLAN", IEEE Communications Magazine, Nov. 2003, pp. 102-108.

* cited by examiner

*Primary Examiner*—Erika A Gary
(74) *Attorney, Agent, or Firm*—Squire, Sanders & Dempsey, L.L.P.

(57) ABSTRACT

The invention relates to a method for performing inter-system handovers in a communication system comprising at least a mobile station, a call state control function, a first and a second call control node, a first and a second media gateway and a radio network node. The handover is achieved by way of connecting a call control node to a call state control function. The call control node allocates a media gateway for the session established. The session media bearers are routed via the media gateway. The call control node acts as an anchor node for the handover. As the mobile station moves to a new cell a media bearer is established to the media gateway from the mobile station via the new cell.

32 Claims, 11 Drawing Sheets

METHOD FOR PERFORMING INTER-SYSTEM HANDOVERS IN A MOBILE COMMUNICATION SYSTEM

BACKGROUND OF THE INVENTION

1. Field of the Invention

The invention relates to handovers in mobile communication systems. Particularly, the invention relates to a method for performing handover between a Wireless Local Area Network (WLAN) and a licensed band cellular communication system.

2. Description of the Related Art

Recently Wireless Local Area Networks (WLAN) have become important in mobile communications. The advantage of WLANs over licensed band cellular communication systems such as the Universal Mobile Telecommunication system (UMTS) and Global System of Mobile communications (GSM) lies in the facts that they use an unlicensed band and the cell sizes are much smaller. Hereinafter, the term cellular communication system refers to a communication system operating in the licensed band. These facts make possible to build private WLANs operated by small corporate entities and individual users. The cost of wireless communication in these WLANs is significantly cheaper than in cellular systems. WLANs have mostly been used for Internet access, but the idea of providing voice communications over WLANs has recently gained momentum. In order to obtain a wide market share for voice over WLAN technologies and to provide a reliable service experience for end-users, it is necessary to be able to provide dual system terminals, which support both WLAN and licensed band based radio access. In other words, it must be possible for users to roam in both WLANs and cellular communication systems.

Usually WLAN radio access is used in urban areas where there exists a WLAN infrastructure, whereas cellular communication systems are used in areas outside the WLAN coverage.

3G Partnership Project has standardized the IP Multimedia Subsystem (IMS) in order to cater for VoIP and other IP based multimedia services. Typically, a UMTS Radio Access Network is used to access a core network, which supports the IMS. However, existing circuit switched core network infrastructures, which comprise Mobile Switching Centers (MSC), Home Location Registers (HLR), Visitor Location Centers (VLR), Camel Service Entities (CSE) and Service Control Points (SCP), provide a wide range of services. Operators wish to accommodate dual system terminals with both WLAN and licensed band radio access capabilities. In order to provide seamless service for the users of dual system terminals, it is beneficial if there were a mechanism to provide handover between the two radio access technologies. Especially, it is important to support handovers from WLAN to a cellular communication system. This is due to the fact that WLANs offer a much more limited and patched radio coverage, which is usually even overlapping with the radio access provided by the cellular communication system. Because of this, for the users there always exists the option of falling back to the use of the cellular communication system. The users may start their sessions in the WLAN side and fall back to the use of the cellular radio access, if the WLAN signal strength shows signs of weakening.

One possible solution for implementing a handover from a WLAN to a cellular communication system is proposed by the company Cingular Wireless, Atlanta, USA. In the solution proposed by Cingular, the voice bearers for a dual-system mobile terminal are routed by the IP Multimedia Subsystem (IMS) to a Media Gateway (MGW) and from the MGW further to a Gateway Mobile Services switching Center (GMSC), which routes the call to the destination. At the time of handover a telephone number is allocated by the IMS and provided to the mobile terminal. The telephone number refers to a conference bridge in association with the MGW. Thereupon, the mobile terminal de-registers from the IMS and performs a GSM location updating to the GMSC. In order to keep the voice bearer, mobile terminal establishes a circuit switched call to the conference bridge. The call set-up requested is routed to the conference bridge by the GMSC using the telephone number. The problem associated with the mentioned solution for handovers is that it requires the use of a conference bridge. The calls from a dual-system mobile terminal must always be routed via a MGW and a GMSC to a called party in order to enable the mobile terminal to reach the MGW using a normal outgoing circuit switched call at the time of handover. This represents a solution, which introduces complication to the call routing procedures. A further disadvantage is the implementation of handover procedures in mobile terminal side, which deviate from the normal intra-cellular communication system handover procedures. The mobile terminal is not able to reuse the software for the implementing of intra-cellular communication system handovers in the implementing of inter-system handovers. Instead, in the Cingular system unusual handover processing logic must be implemented to the mobile terminal software.

Reference is now made to FIG. 1, which illustrates a communication system supporting dual system terminals in prior art. In FIG. 1 there is shown a dual-system mobile station 100. Mobile station 100 is capable of communicating both using an unlicensed band radio access and using licensed band radio access. There is an unlicensed band Base Transceiver Station (BTS) 102. BTS 102 is connected to a Customer Premises Equipment (CPE) 104, which is, for example, an access router. To CPE 104 is connected a Session Border Controller (SBC) 106. There may be a number of unlicensed band base transceiver stations, which are connected via CPE 106 to SBC 106. SBC 106 acts as a SIP proxy and hides the address space within the operator's network, which comprises at least IP access network 108 and the IMS network elements, from MS 100. User plane traffic to/from MS 100 goes via SBC 106. Session border controller 106 is connected to IP access network 108, which performs the packet transport for all user plane related data traffic. In FIG. 1 there is also shown a licensed band radio access network 120 to which is connected a base transceiver station 121. Licensed band radio access network 120 is, for example, a 2G GSM radio access network or a 3G UMTS radio access network. A licensed band IP Connectivity Access Network (IP-CAN) functionality connected to access network 120 comprises at least a serving GPRS support node SGSN 122 and a gateway GPRS support node 124. SGSN 122 performs all mobility management related tasks and communicates with a Home Subscriber Server (HSS) 150. GGSN 124 provides GPRS access points to a media gateway 126 and to a Proxy Call State Control Function (P-CSCF). GGSN 124 establishes Packet Data Protocol (PDP) contexts, which are control records associated with a mobile subscriber such as mobile station 100. A PDP context provides an IP address for packets received from mobile station 100 or any other mobile station that is connected to the licensed band IP connectivity access network 120. The GPRS is disclosed in the 3G Partnership Project specification 23.060.

The communication system illustrated in FIG. 1 comprises IP Multimedia Subsystem (IMS) functionality. The network elements supporting IMS comprise at least one Proxy Call State Control Function (P-CSCF), at least one Inquiring Call State Control Function (I-CSCF), at least one Serving Call State Control Function S-CSCF, at least one Brakeout Gateway Control Function (BGCF) and at least one Media Gateway Control Function (MGCF). As part of the IMS there is also at least one Home Subscriber Server (HSS) Optionally, there is also at least one Application Server, which provides a variety of value-added services for mobile subscribers served by the IP multimedia subsystem (IMS). The IMS is disclosed in the 3G Partnership Project (3GPP) specification 23.228. P-CSCF 130 receives signaling plane packets from GGSN 124. P-CSCF approves Quality of Service (QoS) allocation for the signaling plane PDP context opened in GGSN 124. In the signaling plane packet is carried a Session Initiation Protocol (SIP) signaling message. The Session Initiation Protocol (SIP) is disclosed in the Internet Engineering Task Force (IETF) document RFC 3261. The signaling message is processed by P-CSCF 130, which determines the correct serving network for the mobile station that has sent the signaling packet. The determination of the correct serving network is based on a home domain name provided from mobile station 100. Based on the home domain name is determined the correct I-CSCF, which in FIG. 1 is I-CSCF 132. I-CSCF 132 hides the topology of the serving network from the networks, in which mobile station 100 happens to be roaming. I-CSCF 132 takes contact to home subscriber server 150, which returns the S-CSCF name, which is used to determine the address of the S-CSCF to which the mobile station 100 is to be registered.

In FIG. 1 the S-CSCF determined for mobile station 100 is S-CSCF 134. S-CSCF 134 obtains information pertaining to mobile station 100 from HSS 150. The information returned from HSS 150 may comprise trigger information that is used as criterion for notifying an application server 152. Application server 152 may be notified on events relating to incoming registrations or incoming session initiations. Application server 152 communicates with S-CSCF 134 using the ISC-interface. The acronym ISC stands for IP multimedia subsystem Service Control interface. The ISC interface is disclosed in the 3GPP specification 23.228. The protocol used on ISC interface is SIP. AS 152 may alter SIP invite message contents that it receives from S-CSCF 134. The modified SIP invite message is returned back to S-CSCF 134. If the session to be initiated is targeted to a PSTN subscriber, the SIP invite message is forwarded to a BGCF 140. BGCF 140 determines the network in which PSTN interworking should be performed. In case PSTN interworking is to be performed in the current network, the SIP invite message is forwarded to MGCF 142 from BGCF 140. MGCF 142 communicates with MGW 126. The user plane packets carrying a media bearer or a number of interrelated media bearers for the session are routed from GGSN 124 to MGW 126 as illustrated in FIG. 1 using line 162.

In case mobile station 100 communicates via the unlicensed band radio access the packets are sent via BTS 102, CPE 104 and SBC 106 to IP access network 108. Signaling packets are received in P-CSCF 138. Based on a home domain name provided in the signaling packet P-CSCF 138 determines the correct I-CSCF, to which the signaling packet is to be sent. In FIG. 1 the I-CSCF is I-CSCF 136. I-CSCF 136 inquires the HSS 150 in order to determine the correct S-CSCF for mobile station 100. In this case S-CSCF 134 is determined. Depending on the called party SIP URI S-CSCF 134 determines whether the session is to be routed to a second S-CSCF or to a BGCF such as BGCF 140.

SUMMARY OF THE INVENTION

The invention relates to a method for performing inter-system handovers in a communication system comprising at least a mobile station, a call state control function, a first and a second call control node, a first and a second media gateway and a radio network node. The method comprises: receiving a session set-up message from said mobile station to said call state control function; providing said session set-up message to said first call control node; said first call control node allocating said first media gateway for establishing at least one first media bearer from said first media gateway towards said mobile station; detecting a handover condition in said mobile station; said mobile station sending a handover request to said first call control node via said call state control function; said first call control node determining said second call control node identity based on cell information in said handover request; said first call control node sending a handover request to said second call control node; said second call control node allocating radio resources for said mobile station via said radio network node and allocating a second media gateway; establishing at least one second media bearer between said first and said second media gateway; said mobile station contacting said second call control node using said allocated radio resources via said radio network node; and removing said at least one first media bearer between said mobile station and said first media gateway.

The invention relates also to a system, comprising: a radio network node; a call state control function configured to receive a session set-up message from a mobile station, to provide said session set-up message to a first call control node; said first call control node configured to allocate a first media gateway for establishing at least one first media bearer from a first media gateway towards said mobile station, to determine a second call control node identity based on cell information in a handover request, to send a handover request to said second call control node and to request the removing of at least one first media bearer from said first media gateway towards said mobile station; said mobile station configured to detect a handover condition, to send a handover request to said first call control node via said call state control function and to contact said second call control node using allocated radio resources via said radio network node; said second call control node configured to allocate said radio resources for said mobile station via said radio network node, to allocate a second media gateway and to request the establishment of at least one second media bearer between said first and said second media gateway.

The invention relates also to a call control node comprising: a call control entity configured to receive a set-up request message from a call state control function, to allocate a first media gateway, to request the establishing of at least one first media bearer from a first media gateway towards said mobile station, to determine a second call control node identity based on cell information in a handover request from said call state control function, to send a handover request to said second call control node, to allocate radio resources for said mobile station via a radio network node, to allocate a second media gateway, to request the establishment of at least one second media bearer between said first and said second media gateway, to request the removing of at least one first media bearer between said first and second media gateway.

The invention relates also to an electronic device comprising: a communication entity configured to determine the availability of an unlicensed radio band, to send a session set-up message via unlicensed radio band towards a call state control function, to determine the availability of a licensed radio band and cell information associated with said licensed radio band, to perform decision on handover to said licensed radio band, to send a handover request towards said call state control function, to receive a handover command from said call state control function and to indicate connection establishment towards a call control node.

The invention relates also to a computer program comprising code adapted to perform the following steps when executed on a data-processing system: receiving a session set-up request message from a call state control function; allocating a first media gateway; requesting the establishing of at least one first media bearer from said first media gateway towards a mobile station; determining the identity of a call control node based on cell information in a handover request from said call state control function; sending a handover request to said call control node; receiving a handover preparation request from said call control node; establishing a handover session towards said call control node; and requesting the removing of said at least one first media bearer from said first media gateway towards a mobile station.

The term session comprises, for example, voice calls with only a voice bearer as a single media bearer and video calls with a voice bearer and a video bearer as the media bearers. There may be any number of media bearers carrying, for example, video, audio, shared drawing board or application sharing information.

In one embodiment of the invention, the call state control function receives a registration message from said mobile station. The call state control function fetches subscriber data associated with said mobile station from a Home Subscriber Server (HSS) to the call state control function. The call state control function determines whether said registration message must be provided to the first call control node. The call state control function provides the registration message to the first call control node. The first call control node determines whether said mobile station supports inter-system handover based on mobile station properties either received from the mobile station or from the Home Subscriber Server (HSS). The first call control node performs location update procedure towards a Home Location Register (HLR) and acknowledges the registration message to the mobile station via the call state control function.

In one embodiment of the invention, a communication entity in the mobile station determines the availability of an unlicensed radio band. The mobile station sends a session set-up message via said unlicensed radio band. The mobile station determines the availability of licensed radio band and cell information associated with said licensed radio band. The cell information comprises the cell identity on at least one cell. The cell identity may, for example, be a Cell Global Identity (CGI). The mobile station performs decision on handover to the licensed radio band.

In one embodiment of the invention, the licensed radio band is used by at least one of the Global System of Mobile communications (GSM), the General Packet Radio System (GPRS) and the Universal Mobile Telecommunication System (UMTS).

In one embodiment of the invention, the unlicensed radio band is used by at least one of a Wireless Local Area Network (WLAN), a Bluetooth™ base transceiver station and a short range point-to-point radio base transceiver station.

In one embodiment of the invention, the first and said call control nodes are Mobile Switching Center Servers (MSS). In one embodiment of the invention, the first and said call control nodes are Mobile Switching Centers (MSS).

In one embodiment of the invention, the at least one first media bearer is transmitted over the Internet Protocol (IP) between said mobile station and said first media gateway. The at least one first media bearer comprises at least one connection segment. There may be connection segments leading the bearer first to a session border control, firewall or an arbitrary media proxy and from there towards the first media gateway. A first media bearer from the first media gateway towards the mobile station may have its end points at the first media gateway and at a media proxy along the media bearer path leading towards the mobile station. Associated with media bearers in the media gateways there are connections that connect media bearers and terminations for receiving or transmitting a media bearer. The media bearer connection and terminations are managed, for example, using the ITU-T H.248 protocol from a call control node or a media gateway control function. In one embodiment of the invention, the removing of the at least one first media bearer between said mobile station and said first media gateway consists of the removing of the media bearer termination points, which associated with the at least one media bearer, are at the first media gateway.

In one embodiment of the invention, the radio resources comprise at least one radio channel. In one embodiment of the invention, the at least one radio channel comprises at least one of a carrier frequency, a timeslot, a spreading code and an Orthogonal Frequency Division Multiplexing (OFDM) sub-carrier.

In one embodiment of the invention, the mobile station comprises a Session Initiation Protocol (SIP) user agent.

In one embodiment of the invention, the communication system comprises an IP Multimedia Subsystem (IMS).

In one embodiment of the invention, the system further comprises the radio network node that communicates with a base transceiver station. The base transceiver station is configured to use the licensed band.

In one embodiment of the invention, the system further comprises a second base transceiver station configured to communicate with said call state control function and to communicate with said mobile station using at least one of a Wireless Local Area Network (WLAN) protocol, a Bluetooth™ protocol and a short range point-to-point radio protocol.

In one embodiment of the invention, the system further comprises a session border controller configured to communicate with said mobile station via said second base transceiver station and to transmit said at least one first media bearer over the Internet Protocol (IP) towards said first media gateway.

In one embodiment of the invention, the availability of licensed or unlicensed band at the mobile station is determined in a communication entity of the mobile station. The communication entity establishes a connection from said mobile station to an access router connected to the wireless local area network or it establishes a radio connection from the mobile station to a base transceiver station connected to the radio network node.

In one embodiment of the invention, the mobile communication system comprises at least one of a Global System of Mobile Communications (GSM) network and a Universal Mobile Telephone System (UMTS) network.

In one embodiment of the invention, the first and the second call control nodes are Mobile Service Switching center Servers (MSS). The mobile switching center servers may control at least one media gateway or media proxy, which handle user plane traffic. In the case of mobile switching center servers, the user plane is separated from the control plane. Mobile switching center servers act as call control nodes, which do not necessarily have user plane switching functionality such as a switching matrix.

The user plane traffic may be received from the Public Switched Telephone Network (PSTN) or other call control nodes as a circuit switched connection, which is converted in a media gateway to a packet switched connection.

In one embodiment of the invention, the mobile station comprises a Session Initiation Protocol (SIP) user agent. When in the area of a WLAN or any other unlicensed band radio access, the user agent performs location registration by sending Session Initiation Protocol (SIP) registration messages to the call state control function via a base transceiver station and at least one application layer proxy node.

In one embodiment of the invention, the mobile station comprises a wireless local area network terminal. In one embodiment of the invention, the mobile station comprises a Subscriber Identity Module (SIM).

In one embodiment of the invention, the mobile station is a multi-radio terminal, which is supports both WLAN and licensed band radio connectivity. Licensed band radio connectivity comprises, for example, Global System of Mobile communications (GSM) radio connectivity and Universal Mobile Telecommunication System (UMTS) connectivity on the radio bands that have been allocated for operators providing 2G and 3G service.

In one embodiment of the invention, the call control entity within the call control node is a software component. In one embodiment of the invention, the mobility entity within the call control node is a software component. In one embodiment of the invention, the communication entity within the mobile station node is a software component. Each of these components may comprise at least one independently compiled or translated program module. The components may comprise a number of processes or threads executed in a processor or a virtual machine such as a Java virtual machine.

In one embodiment of the invention, the computer program is stored on a computer readable medium. The computer readable medium may be a removable memory card, magnetic disk, optical disk or magnetic tape.

The benefits of the invention are related to the uniform handling of handover procedures from the mobile terminal software perspective. The invention introduces a mechanism to support a handover from the WLAN radio access to a licensed band radio access. The invention avoids the introduction of extra hardware components to the core network for the handling of voice or multimedia bearers in the case of handover. The invention also enables the easy incorporation of MSC servers and RNCs to the handling of a call originally established by IMS.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
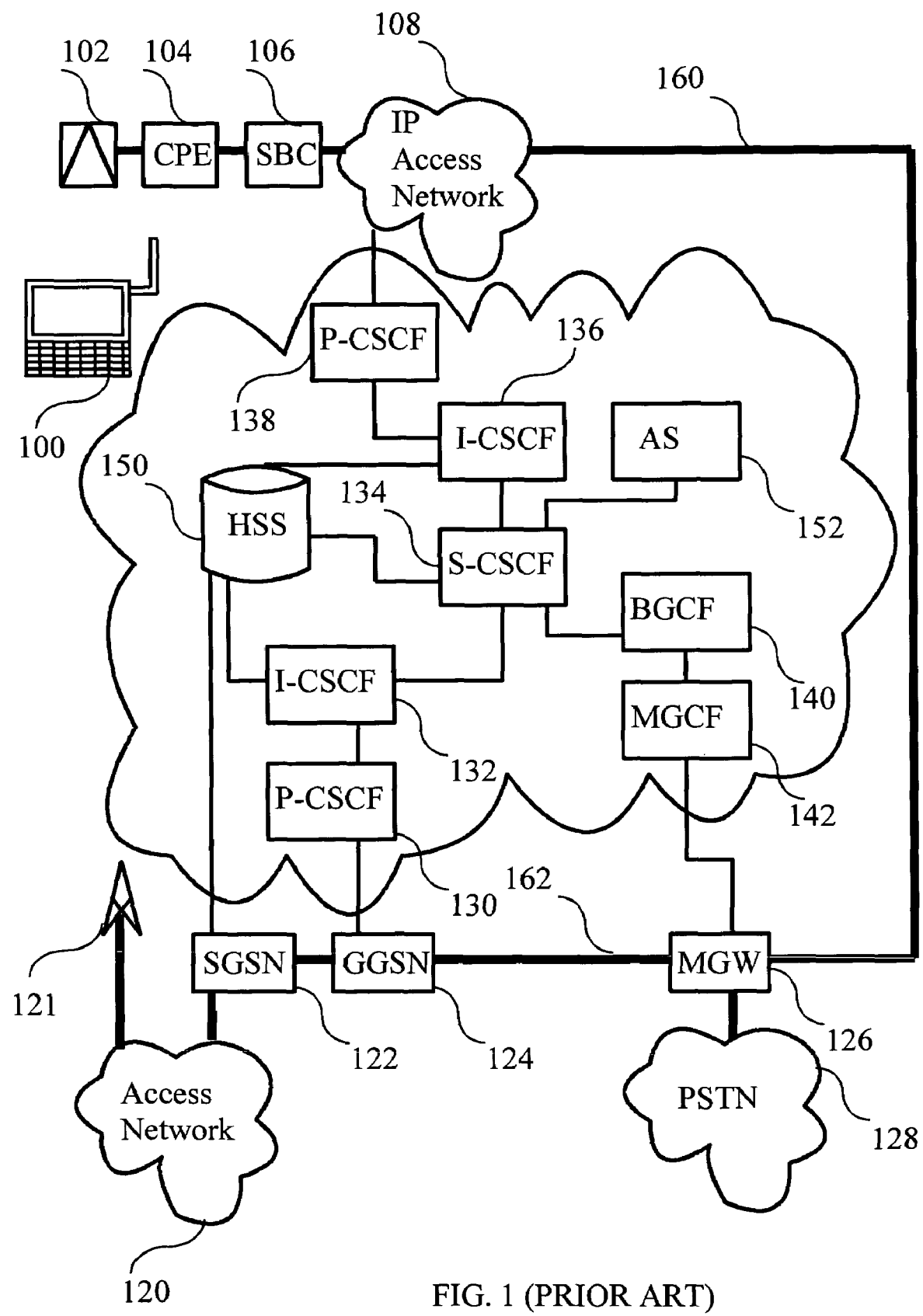
FIG. 1 is a block diagram illustrating an IP Multimedia Subsystem (IMS), a 2G/3G IP Connectivity Access Network (IP-CAN) and an unlicensed band IP Connectivity Access Network (IP-CAN) in prior art.
Figure 2:
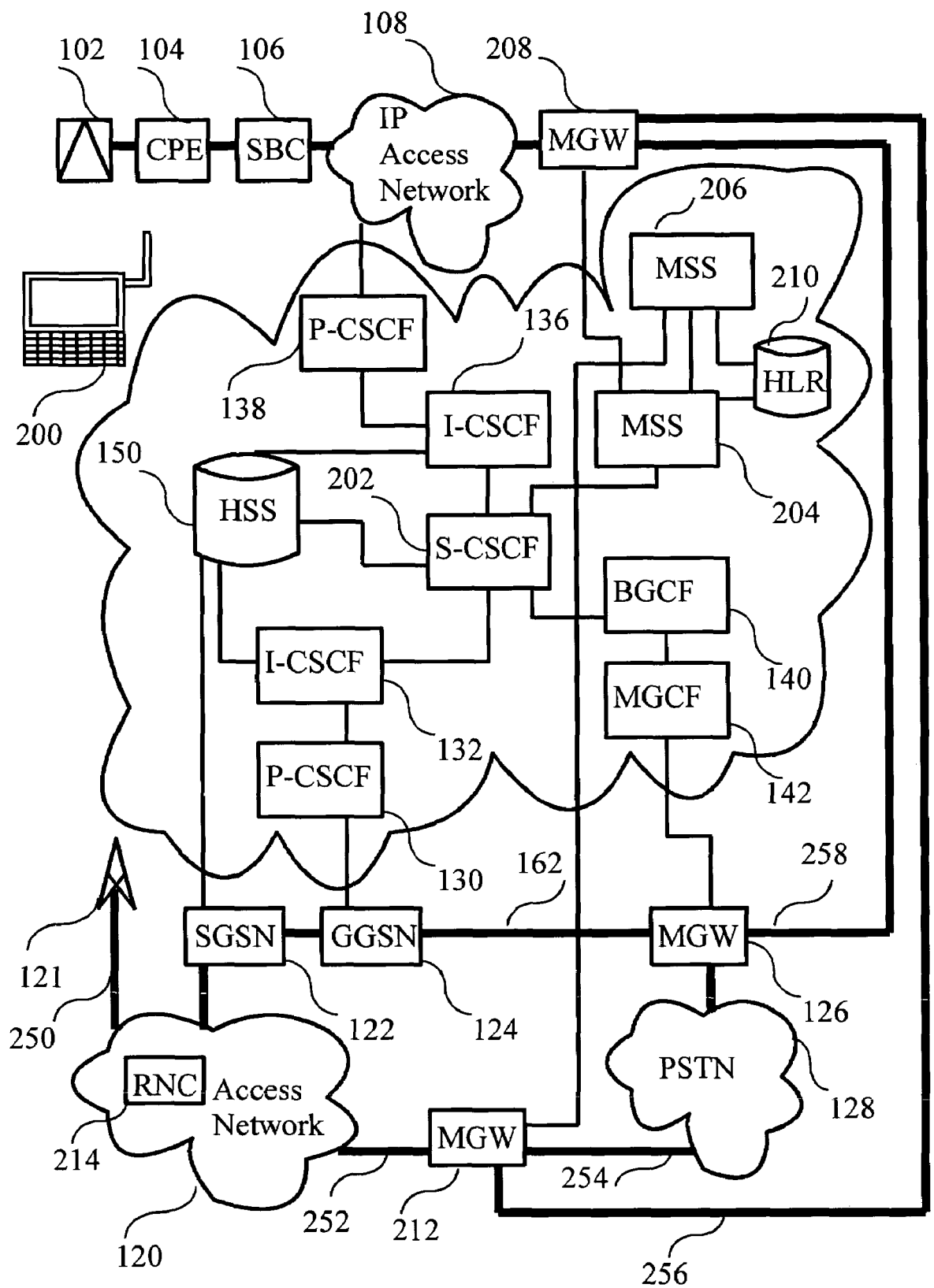
FIG. 2 is a block diagram illustrating an IP Multimedia Subsystem (IMS), a 2G/3G IP Connectivity Access Network (IP-CAN) and an unlicensed band IP Connectivity Access Network (IP-CAN) according to the invention.

FIG. 2 is a block diagram illustrating an IP Multimedia Subsystem (IMS), a 2G/3G IP Connectivity Access Network (IP-CAN) and an unlicensed band IP Connectivity Access Network (IP-CAN) according to the invention. In FIG. 2 there is a dual system mobile station 200, which is capable of communicating using both unlicensed band radio access and licensed band radio access. Mobile station 200 is configured with capability to perform handover from unlicensed band radio access to licensed band radio access. In addition to the IP Multimedia Subsystem (IMS) network elements introduced in FIG. 1 there is a first Mobile Switching Center (MSC) Server (MSS) 204 and a second mobile switching center server 206 and a home location register 210, which communicates with the mentioned mobile switching center servers and stores subscriber data associated with subscribers that are controlled by these mobile switching center servers. There is also an S-CSCF 202, which is capable of triggering an enquiry to MSS 204 if trigger data received from HSS 250 reveals that the mobile subscriber is a handover capable mobile subscriber.

In the case where mobile station 200 is a handover capable mobile station all user plane packets sent form mobile station 200 are routed by IP access network 108 via MGW 208. MSS 204 controls MGW 208 using the H. 248 protocol or using the IETF Media Gateway Control (Megaco) protocol. On the other hand, MSS 206 controls MGW 212. The purpose of MGW 212 is to enable a media bearer originating from mobile station 200 to be connected via licensed band radio access to the MGW 208 during and after handover. The media bearer traffic is routed from mobile station 200 via base station 121 to a radio network controller 214, which is further connected via access network 120 to MGW 212, as illustrated with lines 250 and 252.

As mobile station 200 detects that it is no longer receiving proper radio signal quality from base station 102 it starts to use base transceiver station 121 instead. After the handover the media bearer traffic is routed via the path comprising base station 121, RNC 214 and MGW 212. For example, it may be assumed that mobile station 200 has been communicating with a subscriber in a PSTN 128. Prior to handover mobile station 200 communicates using the unlicensed band radio access. This means that media bearer traffic is routed via the path comprising BTS 102, CPE 104 and SBC 106, MGW 208 and MGW 126. MGW 126 performs interworking towards the PSTN. During the handover mobile station 200 starts to use the licensed band radio access. After the handover media bearer traffic is routed via the path PTS 121, RNC 214 and MGW 212. MGW 212 forwards the traffic to/from MGW 208, which still holds as active the bearer towards MGW 126, as illustrated with line 258. In MGW 208 the new voice or multimedia bearer path can be connected to the voice or multimedia bearer path connecting to PSTN via MGW 126.

Figure 3:
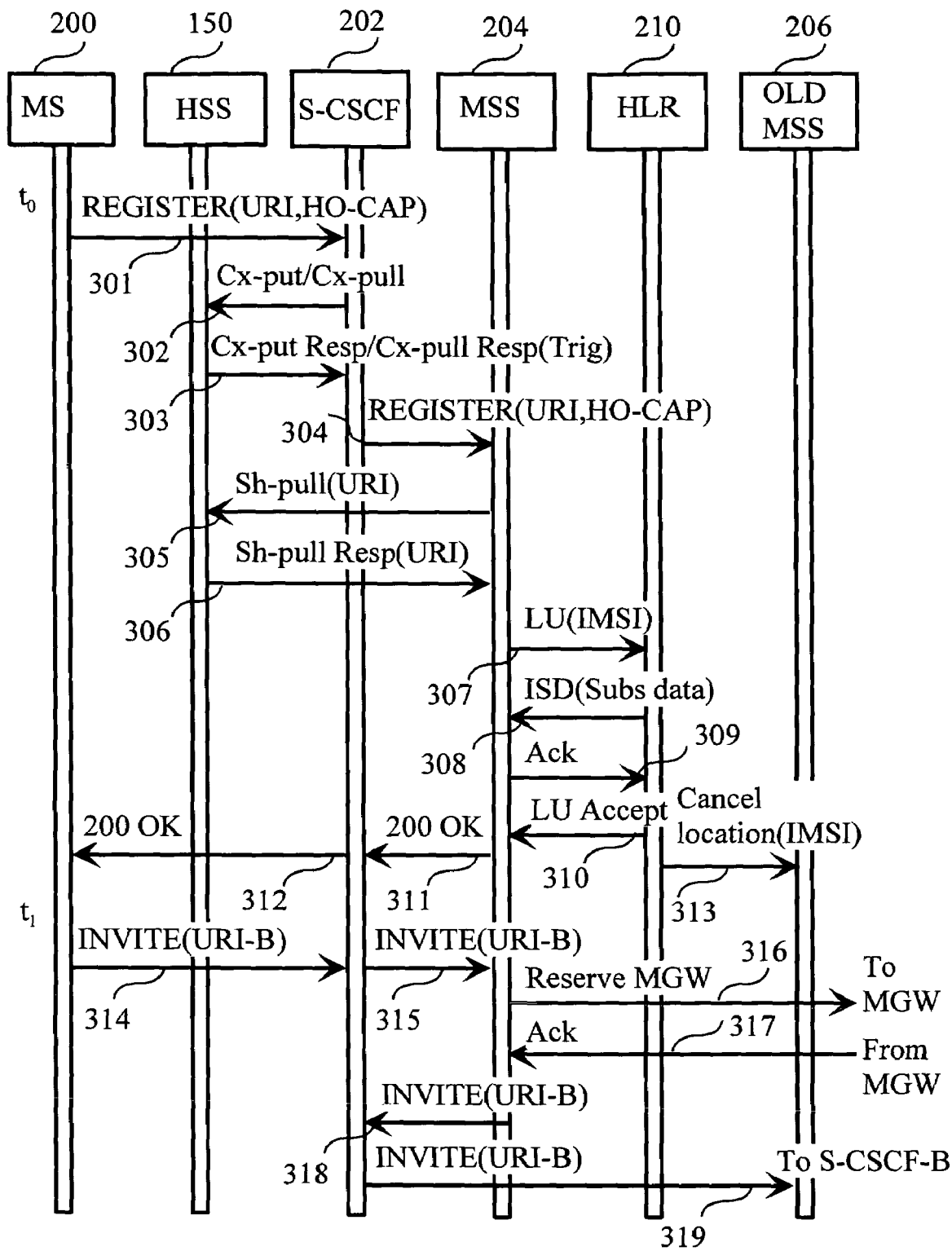
FIG. 3 is a message sequence chart illustrating registration issued from a handover capable Mobile Station (MS) in one embodiment of the invention.

FIG. 3 is a message sequence chart illustrating registration issued from a handover capable Mobile Station (MS) in one embodiment of the invention. In FIG. 3 there is a mobile station 200, a Home Subscriber Server (HSS) 150, a Serving Call State Control Function (S-CSCF) 202, a Mobile Switching Center Server (MSS) 204, a Home Location Register (HLR) 210 and mobile switching center server 206 denoted as the old MSS. At time $t_0$ mobile station 200 is camping on a cell provided by an unlicensed band base transceiver station. The unlicensed band base station controller is connected to an unlicensed band IP Connectivity Access Network (IP-CAN). Mobile station 200 decides to send a registration request to IP multimedia subsystem. A registration request is forwarded by unlicensed band IP connectivity access network to a P-CSCF and from there to an I-CSCF, which determines that the registration must be sent to S-CSCF 202. The registration is sent in the form of a SIP register message as illustrated with arrow 301. The SIP register message comprises at least a URI associated with mobile station 200. The message also comprises a handover capability indicator, which indicates that mobile station 200 is capable of performing handover from unlicensed band radio access to licensed band radio access.

Upon receiving the SIP Register message S-CFCS 202 sends a subscriber data enquiry message to HSS 150. The subscriber data enquiry message is sent in the form of a combined Cx-put and Cx-pull message as illustrated with arrow 302. The Cx-put operation provides data on the current location of mobile station 200 and data on S-CSCF 202. The Cx-pull operation requests subscriber data associated with mobile station 200 from HSS 150. The combined Cx-put and Cx-pull messages are illustrated with arrow 302. The response from HSS 150 comes in the form of a combined Cx-put response and Cx-pull response message. The Cx-pull response message provides trigger data, which reveals for S-CSCF 202 the sessions that must be indicated to MSS 204. Generally, trigger data received from HSS 150 also reveals the registrations and other events that must be indicated from an S-CSCF to an application server. As illustrated in with arrow 304 S-CSCF 202 forwards the SIP register message to MSS 204.

The SIP Register message provides the URI, which represents an identity associated with mobile station 200 for the time being. MSS 204 sends a Sh-pull operation to HSS 150 as illustrated with arrow 305. In response, HSS 150 sends a Sh-pull response message back to MSS 204 as illustrated with arrow 306. Based on data received from mobile station 200 or HSS 150 pertaining to mobile station 200 or the identity associated with mobile station 200, MMS 204 sends a Mobile Application Part (MAP) Location Update message to HLR 210 as illustrated with arrow 307. The Mobile Application Part is disclosed in the European Telecommunications Standards Institute (ETSI) specification GSM 09.02. The location update message provides the international mobile subscriber identity associated with mobile station 200. HLR 210 registers the current location of mobile station 200 and the fact that MMS 204 currently serves the mobile station. HLR 210 sends a MAP Insert Subscriber Data (ISD) message to MMS 204 as illustrated with arrow 308. MMS 204 acknowledges the receipt of subscriber data with acknowledgement message as illustrated with arrow 309. Thereupon HLR 210 send a location update access message to MSS 204 as illustrated with arrow 310. HLR 210 informs the old MMS 206 that has previously been serving mobile station 200 using cancel location operation as illustrated with arrow 313. Upon received location update accept message from HLR 210, MMS 204 send a SIP 2000K message S-CSCF 202 as illustrated with arrow 311. The SIP 200 OK message is sent from S-CSCF 202 to mobile station as illustrated with arrow 312.

At time $t_1$ mobile station 200 decides to set up a SIP session towards a called party that is identified using URI-B. Mobile station 200 sends a SIP invite message to S-CSCF 202 as illustrated with arrow 314. S-CSCF 202 determines that session invitation is associated with a mobile station, which has handover capability. Therefore S-CSCF 202 sends the invite message to MSS 204 as illustrated with arrow 315. Upon receiving the invitation message MSS 204 sends a reservation operation to a media gateway as illustrated with arrow 316. The media gateway is allocated to become part of the at least one media bearer path associated with the session. Media bearer traffic to/from mobile station 200 traverses via the media gateway. The media gateway responds with an acknowledgement message as illustrated with arrow 317. Now MSS 204 forwards the invitation to S-CSCF 202, which sends the invitation further to a S-CSCF associated with the called party, that is the B party. The invitation may also be sent via an I-CSCF in case the serving network of the called party hides network topology.

Figure 4A:
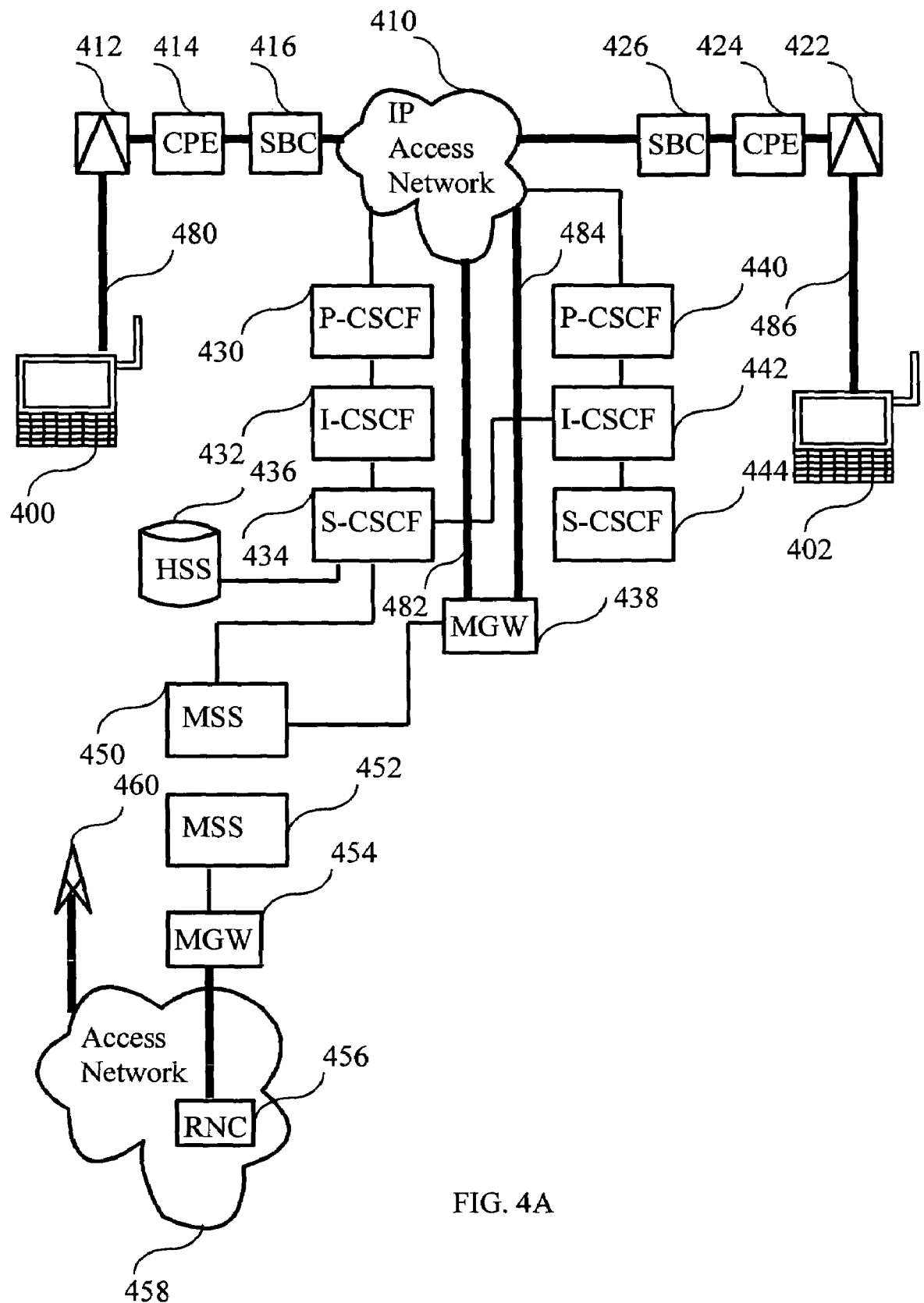
FIG. 4A is a block diagram illustrating a communication system, which comprises an IP Multimedia Subsystem (IMS), a 2G/3G IP Connectivity Access Network (IP-CAN) and an unlicensed band IP Connectivity Access Network (IP-CAN), prior to the handover of a Mobile Station (MS) from the unlicensed band access network to the 2G/3G access network in one embodiment of the invention.

FIG. 4A is a block diagram illustrating a communication system, which comprises an IP Multimedia Subsystem (IMS), a 2G/3G IP Connectivity Access Network (IP-CAN) and an unlicensed band IP Connectivity Access Network (IP-CAN), prior to the handover of a Mobile Station (MS) from the unlicensed band access network to the 2G/3G access network in one embodiment of the invention. In FIG. 4A there are two mobile stations, a mobile station 400 and a mobile station 402. These two mobile stations are communicating with each other and they have set up a SIP session between each other. Mobile station 400 communicates with an IP access network 410 via an unlicensed band base transceiver station 412, a CPE 414 and an SBC 416. Mobile station 402 communicates with IP access network 410 using a base transceiver station 422, CPE 424 and SBC 426. SIP signaling messages from mobile station 400 are routed to mobile station 402 via IP multimedia subsystem network elements associated with the calling party, namely via P-CSCF 430, I-CSCF 432 and S-CSCF 434, and via network elements associated with the called party, namely via I-CSCF 442, S-CSCF 444 and repeatedly via I-CSCF 442 at P-CSCF 440. The radio bearer between mobile station 400 base transceiver station 412 is illustrated with line 480. The media bearer from mobile station 400 is routed to IP access network 410. The media bearer is routed by IP access network 410 to MGW 438 as illustrated with line 482. The media bearer path is routed back from MGW 438 via media bearer 484 to IP access network 410, which routes 484 media bearer traffic via session border controller 426 towards mobile station 402. The radio bearer between mobile station 402 and base transceiver station 422 is illustrated with line 486. The SBC 426 connects media bearer 484 to radio bearer 428 via CPE 424 and base transceiver station 422.

In case mobile station 400 is not a handover capable mobile station then the voice or multimedia bearers between mobile station 400 and mobile station 402 were not routed via MGW 438, instead they are directly routed by IP access network 410 from session border controller 416 to session border controller 426. When a voice or multimedia session is set up between mobile station 400 and mobile station 402, S-CSCF 434 determines from subscriber data earlier received from HSS 436 that the session invitation must be sent via MMS 450. MMS 450 reserves MGW 438. Thereupon, it adds information concerning the routing of voice or IP multimedia bearers to the session descriptions carried in the SIP invite message. The modified SIP invite message is forwarded from MMS 450 to S-CSCF 434, which routes the session invitation, that is, the SIP invite message towards I-CSCF 442. In FIG. 4A there is also a licensed band radio access network 458 to which is connected a base transceiver station 460 and a second MGW 454. MSS 452 controls second MGW 454. The licensed band radio access network 458 also comprises a radio network controller RNC 456.

Figure 4B:
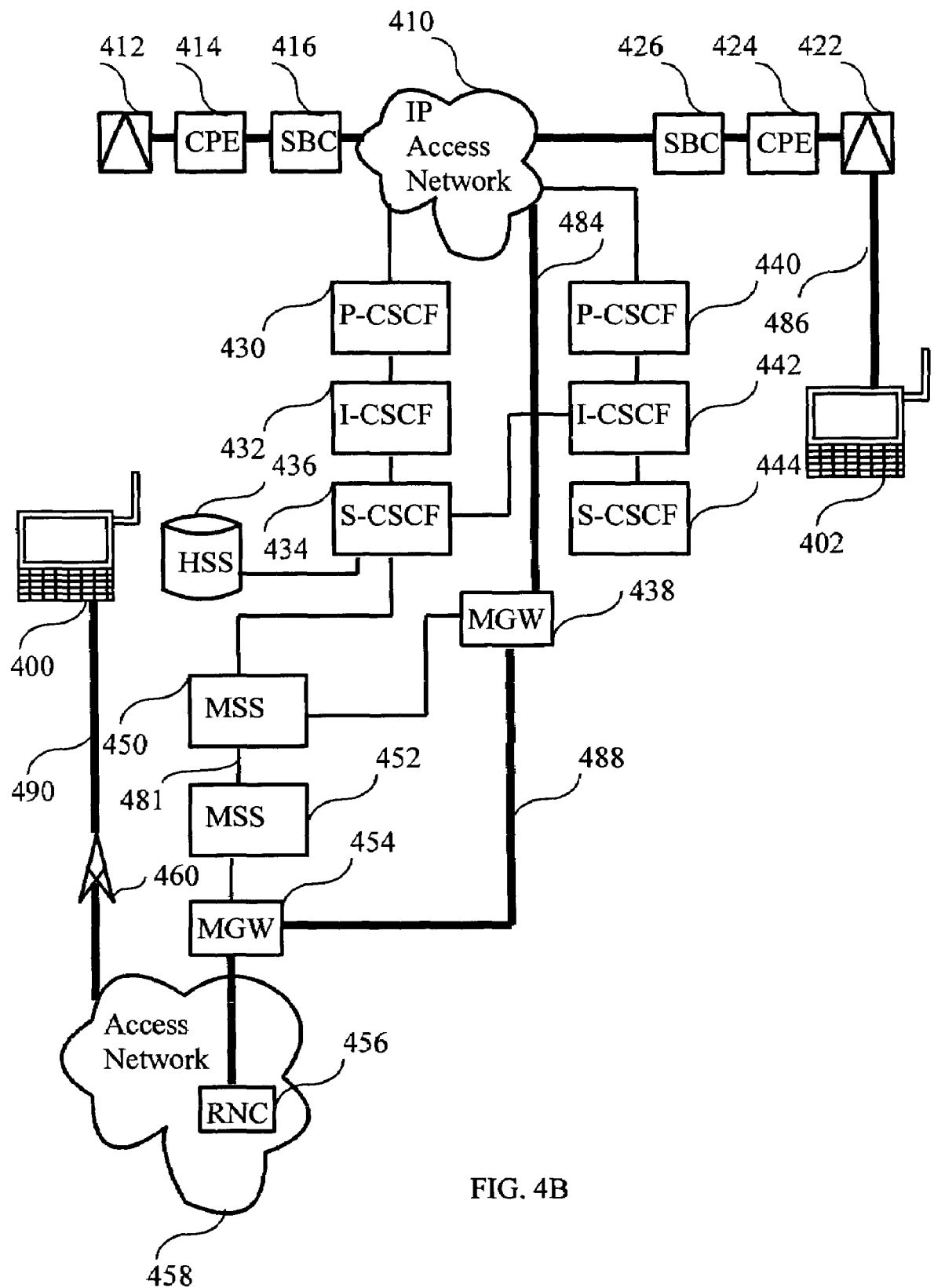
FIG. 4B is a block diagram illustrating a communication system, which comprises an IP Multimedia Subsystem (IMS), a 2G/3G IP Connectivity Access Network (IP-CAN) and an unlicensed band IP Connectivity Access Network (IP-CAN), after the handover of a Mobile Station (MS) from the unlicensed band access network to the 2G/3G access network in one embodiment of the invention.

FIG. 4B is a block diagram illustrating a communication system, which comprises an IP Multimedia Subsystem (IMS), a 2G/3G IP Connectivity Access Network (IP-CAN) and an unlicensed band IP Connectivity Access Network (IP-CAN), after the handover of a Mobile Station (MS) from the unlicensed band access network to the 2G/3G access network in one embodiment of the invention. In the situation illustrated in FIG. 4B mobile station 400 has performed a handover from unlicensed band radio access to licensed band radio access. A radio bearer is established between mobile station 400 and base transceiver station 460. The radio bearer is illustrated with line 490. As MMS 450 has been informed of the need of handover via S-CSCF 434, it has set up a handover session towards MMS 452. As part of the handover session set-up MMS 450 has requested MGW 438 to establish a bearer towards MGW 454. The bearer established is illustrated with line 488. Between MGW 454 and RNC 456 is set up an Iu-interface bearer. The bearer path set-up via RNC 456 within licensed band radio access network, MGW 454 and MGW 438 acts as a replacement for the original bearer path illustrated in FIG. 4A with lines 480 and 482. Thus MMS 452 catches the bearer path associated with the session between mobile station 400 and mobile station 402.

Figure 5A:
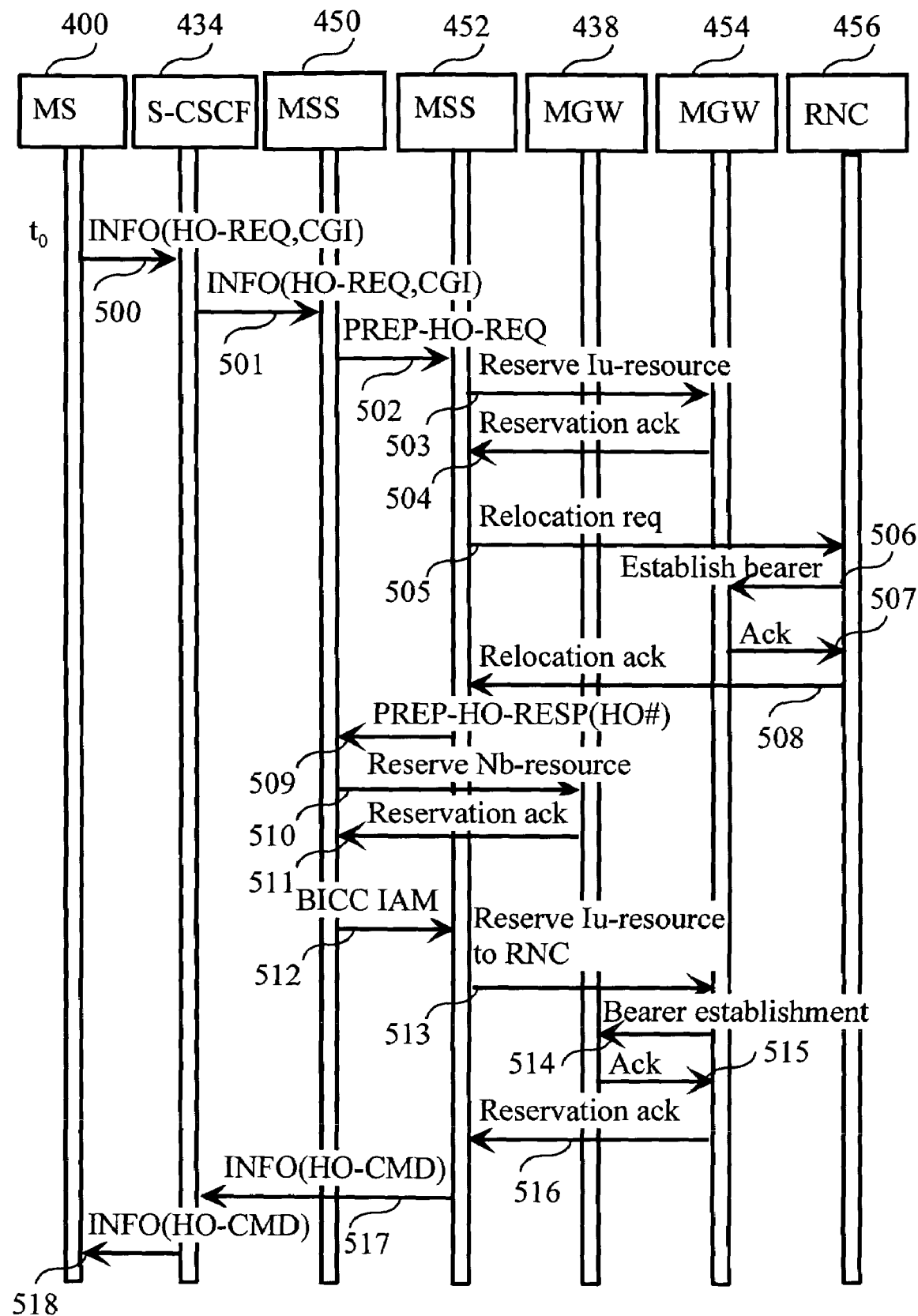
FIG. 5A is a message sequence chart depicting handover signaling until the connection establishment from a Mobile Station (MS) to the 2G/3G access network.

FIG. 5A is a message sequence chart depicting handover signaling until the connection establishment from a Mobile Station (MS) to the 2G/3G access network. In FIG. 5A there is mobile station 400, a S-CSCF 434, MSS 450, MSS 452, a first MGW 438, a second MGW 454 and an RNC 456, which are familiar from FIGS. 4A and 4B. At time $t_0$ mobile station 400 has been using an unlicensed band base transceiver station to communicate towards S-CSCF 434. Based on radio measurements mobile station 400 determines that radio quality provided by the unlicensed band base transceiver station is degrading rapidly. Mobile station has also been listening to a base transceivers station provided by a licensed band cellular communication system. Based on the degrading radio quality on unlicensed band side mobile station determines that it is required to perform handover to licensed band side. Therefore mobile station 400 sends a SIP Info message to S-CSCF 434 as illustrated with arrow 500. In one embodiment of the invention, the SIP Options message is sent instead. The SIP Info message carries a handover request and a Cell Global Identity. The SIP Info message is forwarded to MSS 450 as illustrated with arrow 501. Based on the cell global identity MSS 450 determines that the cell in the licensed band side is served by a MSS 452. The analysis of cell global identity provides the address of MMS 452.

MMS 450 sends a MAP prepare handover request message to MMS 452 as illustrated with arrow 502. MMS 452 issues a reservation request to MGW 454 as illustrated with arrow 503. MGW 454 reserves a connection towards Iu-interface and acknowledges the reservation as illustrated with arrow 504. MSS 452 sends a relocation request RNC 456. RNC 456 sends a bearer establishment request to MGW 454 as illustrated with arrow 506. MGW 454 acknowledges the establishment as illustrated with arrow 507. The radio resources from the licensed band radio cell identified using cell global identity are reserved. RNC 456 sends a relocation acknowledgement to MMS 452 as illustrated with arrow 508. MSS 452 sends a prepare handover response message to MSS 450 as illustrated with arrow 509. The mobile application part prepare handover response message comprises a handover number, which is used by MSS 450 to route a handover session to MSS 452. MSS 450 sends a reservation request to MGW 438, which tells to reserve a connection towards the Nb-interface between two media gateways. The reservation request is illustrated with arrow 510. MGW 438 acknowledges the reservation to MSS 450 as illustrated with arrow 511.

MSS 450 analyses the handover number and sends a Bearer Independent Call Control (BICC) Initial Address Message (IMA) to MSS 452 as illustrated with arrow 512. MSS 452 sends a resource reservation message to MGW 454 telling MGW 454 to reserve Iu-resources to RNC 456. The reservation is illustrated with arrow 513. In response to the resource reservation request, MGW 454 establishes a bearer with MGW 438 as illustrated with arrows 514 and 515. MGW 454 acknowledges the resource reservation to MSS 452 as illustrated with arrow 516. MSS 452 sends the SIP Info message S-CSCF 434 as illustrated with arrow 517. The SIP Info message carries a handover command to be sent to mobile station 400. As illustrated with arrow 518 S-CSCF 434 send the info message to mobile station 400.

Figure 5B:
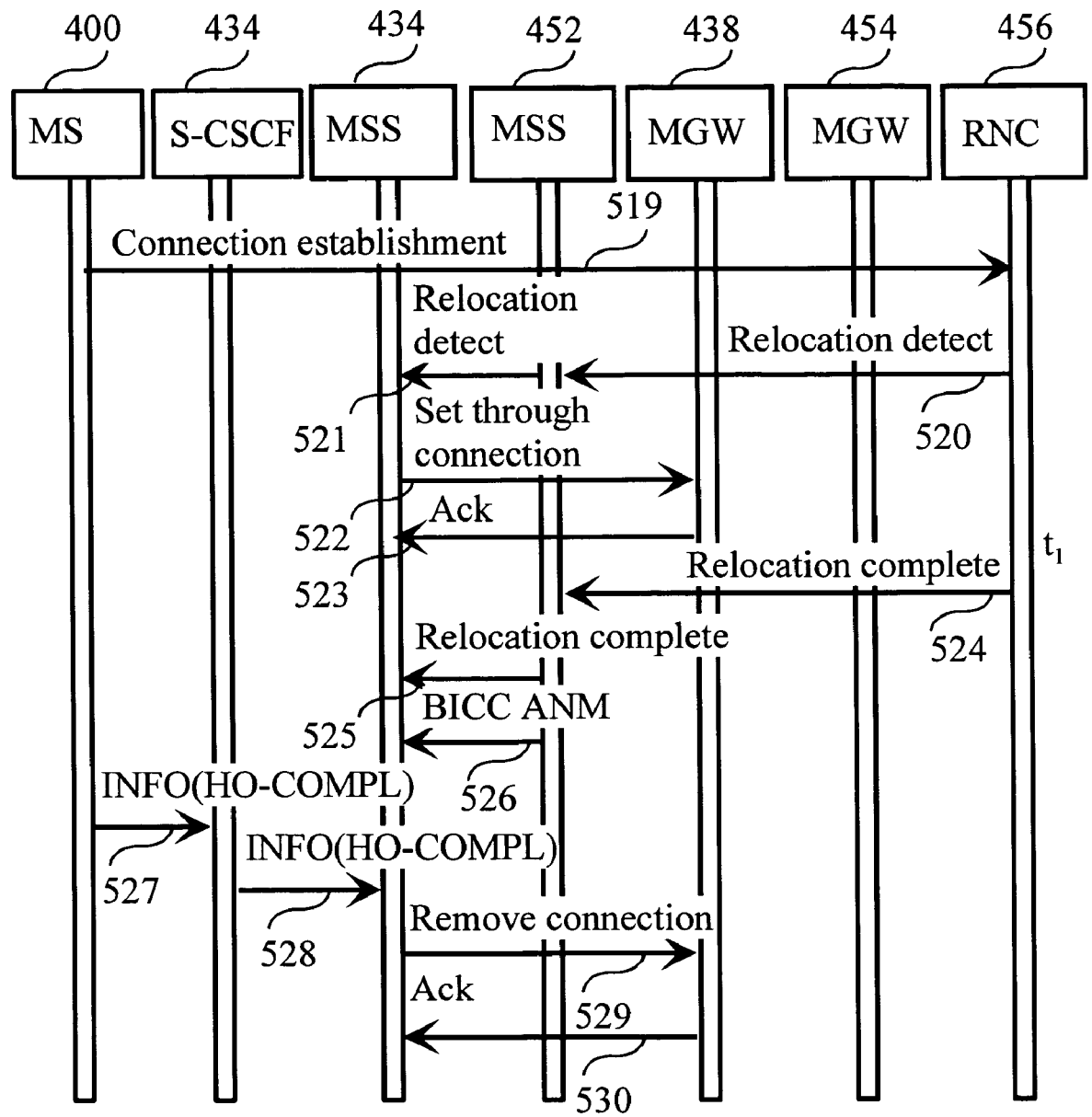
FIG. 5B is a message sequence chart depicting handover signaling after the connection establishment from a Mobile Station (MS) to the 2G/3G access network.

FIG. 5B is a message sequence chart depicting handover signaling after the connection establishment from a Mobile Station (MS) to the 2G/3G access network. The handover establishment illustrated in FIG. 5A continues in FIG. 5B. Mobile station 400 has now tuned to the radio channel allocated from the new cell. Mobile station 400 sends a connection establishment message to RNC 456 as illustrated with arrow 519. In response to connection establishment RNC 456 sends a relocation detect message to MSS 452 as illustrated with arrow 520. MSS 452 sends the relocation detect message to MSS 438 as illustrated with arrow 521. MSS 434 sends a through connection request to MGW 438 as illustrated with arrow 522. MGW 438 acknowledges the through connection to MSS 434 as illustrated with arrow 523. At time $t_1$ RNC 456 sends a relocation complete message to MSS 452 as illustrated with arrow 524. MSS 452 sends the relocation complete to MSS 434 as illustrated with arrow 525. MSS 452 sends a BICC Answer Message (ANM) MSS 434 as illustrated with arrow 526. Mobile station 400 informs the serving S-CSCF 434 of handover completion using a SIP info message as illustrated with arrow 527. S-CSCF 434 forwards the SIP Info message to MMS 434 as illustrated with arrow 528. MMS 434 tells MGW 438 to remove the connection towards unlicensed band radio access network. As the connection is removed MGW 438 acknowledges to MSS 434 as illustrated with arrow 530.

Figure 6:
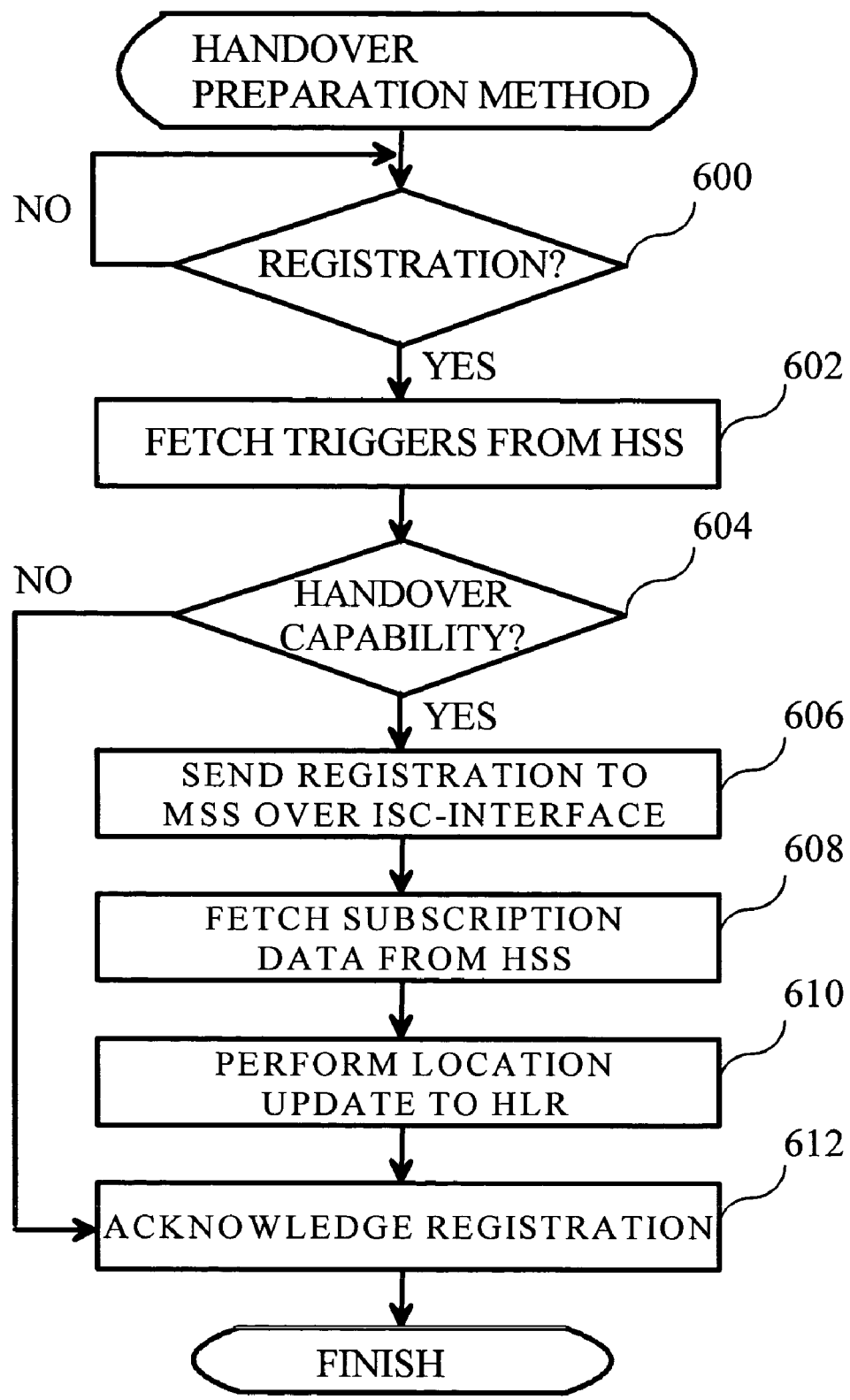
FIG. 6 is a flow chart illustrating a handover preparation method in one embodiment of the invention.

FIG. 6 is a flow chart illustrating a handover preparation method in one embodiment of the invention.

At step 600 the serving CSCF waits for registration from a mobile station. If no registration is received, the method continues at step 600. As soon as a registration is received the method continues step 602.

At step 602 the serving CSCF fetches subscriber data associated with the mobile station that has performed the registration. The subscriber data is received from home subscriber server.

At step 604 based on trigger information in the subscriber data the serving CSCF determines if the mobile station has handover capability. If the mobile station does not have handover capability, in other words, no triggering is defined towards MSC server the method continues at step 612. If the trigger data the method continues at step 606.

At step 606 Serving CSCF send the registration message to a MSC server over ISC-interface.

At step 608 the MSC server fetches also subscription data from the home subscriber server.

At step 610 MSC server performs a mobile application part location update procedure to a home local register that has been indicated in the subscriber data. The home location register acknowledges the location update.

At step 612 the MSC server acknowledges the registration to serving CSCF and serving CSCF acknowledges the registration to the mobile station.

Figure 7A:
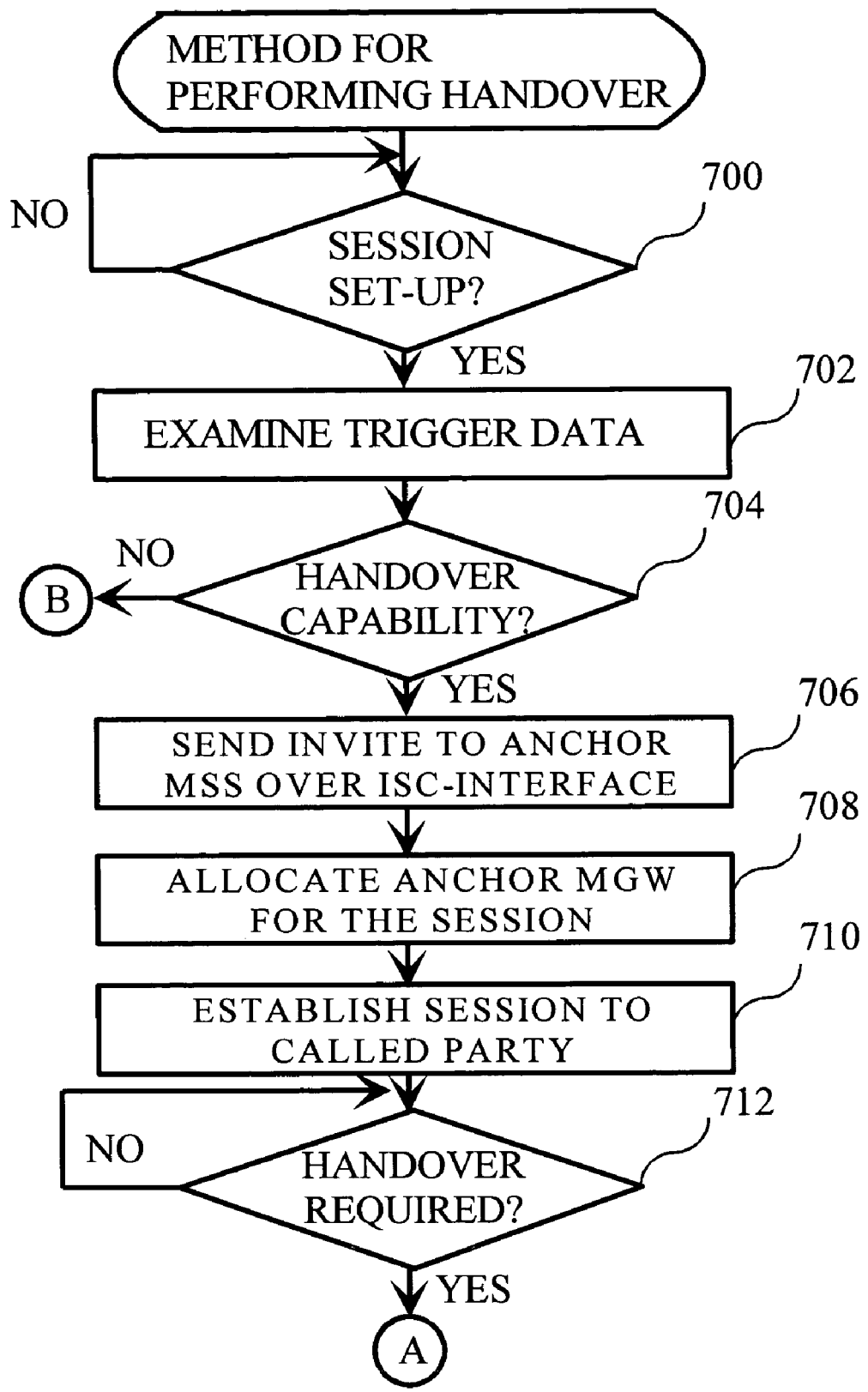
FIG. 7A is a flow chart illustrating the first part of a method for performing handover in one embodiment of the invention.

FIG. 7A is a flow chart illustrating the first part of a method for performing handover in one embodiment of the invention.

At step 700 a serving CSCF waits for a SIP Invite message indicating session set-up request from mobile station. If there is not set-up request the method remains at step 700. If a session set-up is received the method continues at step 702.

At step 702 serving CSCF examines trigger data received from home subscriber server during registration.

At step 704 serving CSCF determines from subscriber data associated with the mobile station whether the mobile station has handover capability or generally whether in the trigger data is indicated a triggering to an MSC server. The presence of triggering data for MSC server is an indication of the mobile station's handover capability. If the mobile station does not have handover capability the method continues at label B. If the mobile station has handover capability the method continues at step 706.

At step 706 serving CSCF send the SIP Invite message to an anchor MSC server over the ISC-interface. The MSC server will act as an anchor point for future handovers. It is an anchor point, to which other MSC serves will take contact in the case of handover performed by the mobile station.

At step 708 the anchor MSC server allocates a connection from an anchor media gateway for the session. The media bearers associated with the session will be routed via anchor media gateway. At step 710 the anchor MSC server returns a SIP Invite message back to serving CSCF, which established the session to called party.

At step 712 the mobile station determines whether a handover is required to the licensed band radio access from unlicensed band radio access. If no handover is required the method continues at step 712. As soon as the handover is required the method continues at label A, which is connected to step 714.

Figure 7B:
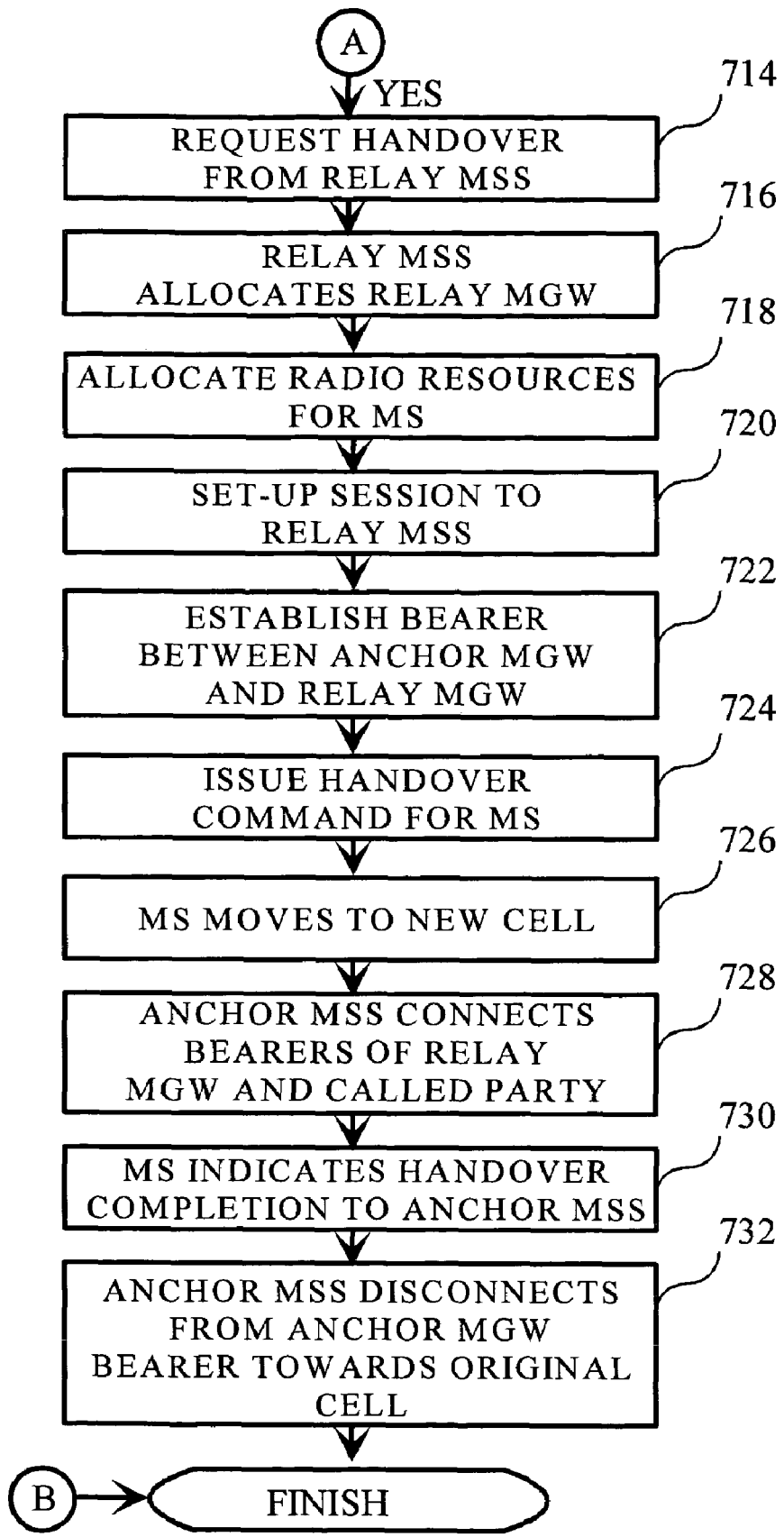
FIG. 7B is a flow chart illustrating the second part of a method for performing handover in one embodiment of the invention.

FIG. 7B is a flow chart illustrating the second part of a method for performing handover in one embodiment of the invention.

At step 714 handover is requested from relay MSC server. Mobile station send a handover request to serving CSCF, which forwards the handover request to anchor MSC, which determines based on the cell global identity the correct relay MSC server for the call. The handover request is then finally sent to the relay MSC server.

At step 716 the relay MSC server allocates a relay media gateway for the handover session.

At step 718 radio resources are allocated from the licensed band cell to the mobile station. The connection between the relay media gateway and the radio network controller is also established as well as the connection between base transceiver station serving the new cell and the radio network controller.

At step 720 the anchor MSC server sets up session to the relay MSC server. The session set-up is implemented by sending a call, that is, a session set-up request based on a handover number provided by the relay MSC server. The session set-up request is conveyed, for example, using a BICC Initial Address Message.

At step 722 in response to the receiving of the handover session set-up request, a connection is established between the anchor media gateway and the relay media gateway.

At step 724 a handover command is issued towards the mobile station. The handover command tells the mobile station to tune to the indicated radio channel in the licensed band radio cell.

At step 726 the mobile station starts using the new cell and establishes contact via the new cell to the radio network controller. The radio network controller informs the relay MSC server of the detection of the handover. The relay MSC server informs this to the anchor MSC server.

At step 728 the anchor MSC server connects the bearer towards the relay media gateway and the bearer towards the called party. At this point the media bearer is now established to the mobile station via the new cell.

At step 730 the mobile station indicates handover completion to anchor MSC server. The indication goes via the original unlicensed band base transceiver station and the serving CSCF.

At step 732 the anchor MSC server disconnects from the anchor media gateway the bearer connection towards the original unlicensed band base transceiver station. Label B points to the finishing of the method.

Figure 8:
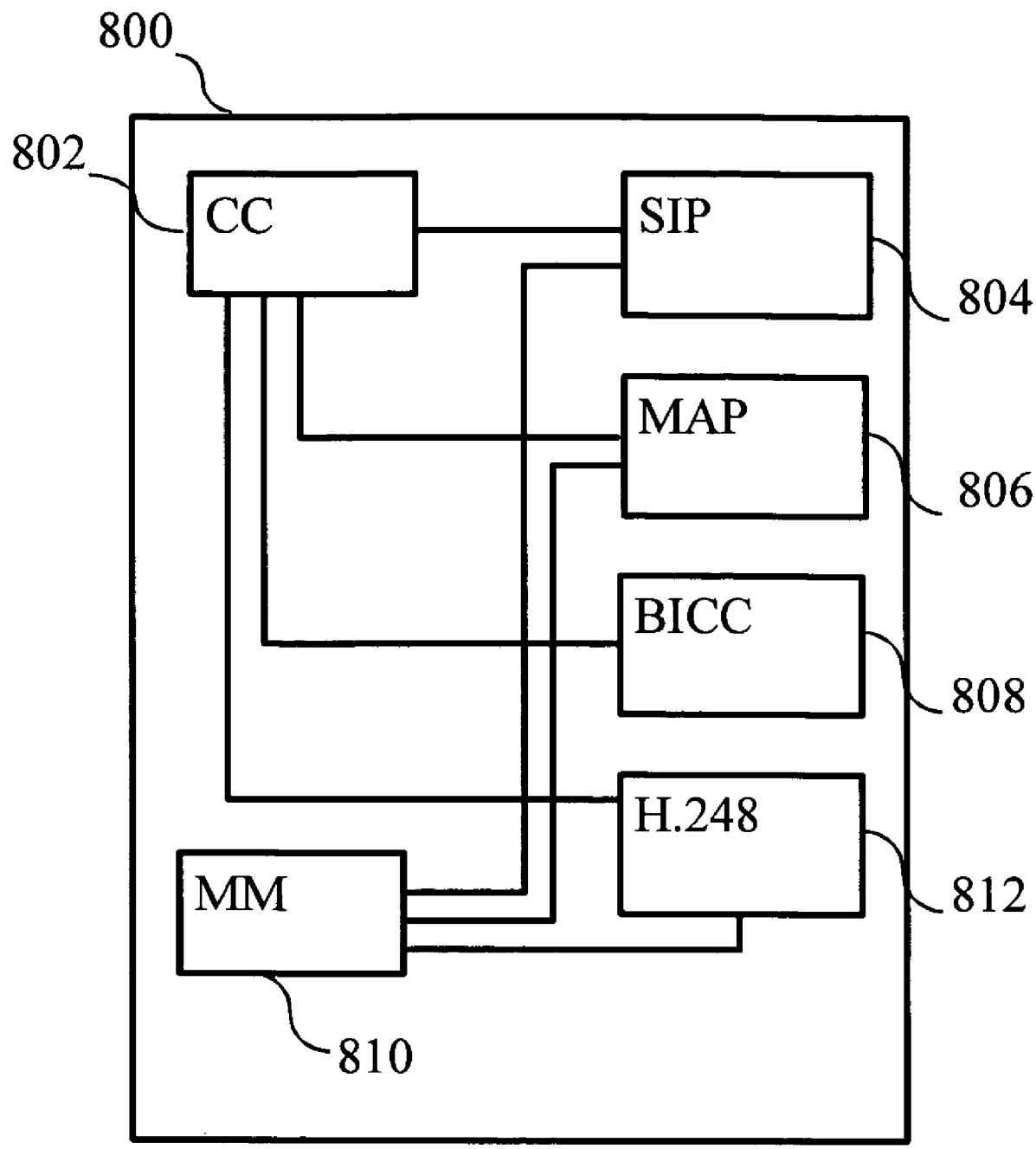
FIG. 8 is a block diagram illustrating a Mobile Switching Center Server (MSS) in one embodiment of the invention.

FIG. 8 is a block diagram illustrating a Mobile Switching Center (MSC) Server (MSS) in one embodiment of the invention. In FIG. 8, there is an MSC server 800 in one embodiment of the invention. In FIG. 8 the software components in MSC server 800 are illustrated. MSC server 800 comprises a call control entity 802. The call control entity is responsible for all call and session establishment maintaining and release related tasks. Call control entity is also responsible for establishing handover sessions between a relay MSC server and an anchor MSC server. Call control entity 802 performs also connection management by issuing connection management requests and bearer allocation requests to a media gateway control entity 812. Media gateway control entity 812 communicates with a media gateway using ITU-T protocol H.248 or the IETF megaco protocol. There is a session initiation protocol entity 804, which performs all SIP signaling related tasks, such as the handling of SIP requests and responses.

There is also a Mobile Application Part (MAP) signaling entity 806, which takes care of all mobile application part signaling that is all handover request, handover response, handover detect and handover completion signaling messages. It should be noted that the MAP signaling entity 806 might also use any other mobility management protocol, which provides the necessary messages for handover request, detection and completion.

There is also a bearer independent call control signaling entity 808, which performs the setting-up of bearer independent calls between MSC-servers. There is also a mobile management entity 810, which performs all location registration related tasks and communicates with the home location register and which also records the current location of the mobile station. Mobile management may also take part in the handover preparation and completion signaling.

Communication between call control entity 802 and signaling entities 804, 806, 808 and 812 occurs in a internal format, which corresponds to the respective signaling messages received to or sent from the signaling entities. Mobile management entity 810 also communicates with signaling entities using internal format messages. The software components, that is, the entities illustrated in FIG. 8 may be implemented in various ways. They may be implemented as processes executed under the native operating system of the MSC server. The software entities may be implemented as separate processes or so that a number of different software entities is implemented by means of one process.

It is obvious to a person skilled in the art, that with the advancement of technology, the basic idea of the invention may be implemented in various ways. The invention and its embodiments are thus not limited to the examples described above; instead they may vary within the scope of the claims.

The invention claimed is:

1. A method, comprising:
receiving a session set-up message from a mobile station to a call state control function;
determining inter-system handover support of the mobile station in said call state control function;
providing said session set-up message to a first call control node in response to said inter-system handover support of the mobile station;
requesting an allocation of a first media gateway from said first call control node;
receiving a handover request to said first call control node from said mobile station via said call state control function;
determining in said first call control node an identity of a second call control node based on cell information in said handover request;
sending the handover request from said first call control node to said second call control node;
receiving a handover number to said first call control node from said second call control node in response to said handover request;
routing a handover session from said first call control node to said second call control node using said handover number;
receiving an answer message to said first call control node from said second call control node;
receiving a handover completion message to said first call control node from said call state control function; and
requesting a removing of at least one packet switched media bearer from said media gateway.

2. The method according to claim 1, the method further comprising:

receiving a registration message from said mobile station to said call state control function;
fetching subscriber data associated with said mobile station from a home subscriber server to said call state control function;
determining in said call state control function whether said registration message must be provided to said first call control node;
providing said registration message to said first call control node;
determining in said first call control node whether said mobile station supports inter-system handover;
performing location update procedure between said first call control node and a home location register; and
said first call control node acknowledging said registration message to said mobile station via said call state control function.

3. The method according to claim 1, the method further comprising:
said mobile station determining the availability of an unlicensed radio band;
said mobile station sending a session set-up message via said unlicensed radio band;
said mobile station determining the availability of a licensed radio band and cell information associated with said licensed radio band; and
said mobile station performing decision on handover to said licensed radio band.

4. The method according to claim 3, wherein said licensed radio band is used by at least one of the global system of mobile communications, the general packet radio system and the universal mobile telecommunication system.

5. The method according to claim 3, wherein said unlicensed radio band is used by at least one of a wireless local area network, a Bluetooth™ base transceiver station and a short range point-to-point radio base transceiver station.

6. The method according to claim 1, wherein said first call control node and said second call control node are mobile switching center servers.

7. The method according to claim 1, wherein said at least one packet switched media bearer is transmitted over Internet Protocol between said mobile station and said media gateway.

8. The method according to claim 1, wherein radio resources used by said mobile station comprise at least one radio channel.

9. The method according to claim 8, wherein each of said at least one radio channel comprises at least one of a carrier frequency, a timeslot, a spreading code and an orthogonal frequency division multiplexing sub-carrier.

10. The method according to claim 1, wherein said mobile station comprises a session initiation protocol user agent.

11. The method according to claim 1, wherein a communication system of the call control nodes comprises an IP multimedia subsystem.

12. A system comprising:
a call state control function node configured to receive a session set-up message from a mobile station, to determine inter-system handover support of the mobile station, to provide said session set-up message to a first call control node in response to said inter-system handover support of said mobile station, and wherein said first call control node is configured to request an allocation of a first media gateway,
receive a handover request from said mobile station via said call state control function, to determine an identity of a second call control node based on cell information in said handover request, send the handover request to said second call control node, receive a handover number from said second call control node in response to said handover request, route a handover session from said first call control node to said second call control node using said handover number, receive an answer message from said second call control node, receive a handover completion message from said call state control function, and request a removing of at least one packet switched media bearer from said media gateway.

13. The system according to claim 12, wherein said call state control function is further configured to receive a registration message from said mobile station, to fetch subscriber data associated with said mobile station from a home subscriber server, to determine whether said registration message must be provided to said first call control node and to provide said registration message to said first call control node, and said first call control node is configured to determine whether said mobile station supports inter-system handover, to perform a location update procedure towards a home location register and to acknowledge said registration message to said mobile station via said call state control function.

14. The system according to claim 12, wherein said mobile station is configured to determine the availability of an unlicensed radio band, to send a session set-up message via said unlicensed radio band, to determine the availability of a licensed radio band and cell information associated with said licensed radio band and to perform decision on handover to said licensed radio band.

15. The system according to claim 14, wherein a radio network node is configured to be connected to a base transceiver station, said base transceiver station being configured to use said licensed band.

16. The system according to claim 12, the system further comprising:

a second base transceiver station configured to communicate with said call state control function and to communicate with said mobile station using at least one of a wireless local area network protocol, a Bluetooth™ protocol and a short range point-to-point radio protocol.

17. The system according to claim 16, the system further comprising:

a session border controller configured to communicate with said mobile station via said second base transceiver station and to transmit said at least one first media bearer over Internet Protocol towards said media gateway.

18. The system according to claim 12, wherein said first call control node and said second call control node are mobile switching center servers.

19. The system according to claim 12, wherein said radio resources comprise at least one radio channel.

20. The system according to claim 19, wherein each said at least one radio channel comprises at least one of a carrier frequency, a timeslot, a spreading code and an orthogonal frequency division multiplexing sub-carrier.

21. The system according to claim 12, wherein said mobile station comprises a session initiation protocol user agent.

22. The system according to claim 12, wherein said system comprises an IP multimedia subsystem.

23. An apparatus, comprising:

a call controller configured to request an allocation of a first media gateway, receive a handover request from a mobile station via a call state control function, determine an identity of a second call control node based on cell information in said handover request, send the handover request to said second call control node, receive a handover number from said second call control node in response to said handover request, route a handover session from said first call control node to said second call control node using said handover number, receive an answer message from said second call control node, receive a handover completion message from said call state control function, and request a removing of at least one packet switched media bearer from said media gateway.

24. The apparatus according to claim 23, wherein said first call control node and said second call control node are mobile switching center servers.

25. The apparatus according to claim 23, wherein said at least one packet switched media bearer is transmitted over Internet Protocol between said mobile station and said first media gateway.

26. The apparatus according to claim 23, wherein radio resources for said mobile station comprise at least one radio channel.

27. The apparatus according to claim 23, wherein said mobile station comprises a session initiation protocol user agent.

28. The apparatus according to claim 23, wherein a communication system of the call control nodes comprises an IP multimedia subsystem.

29. A computer program embodied on a computer readable medium, wherein when the computer program is executed the computer program is configured to control a processor to perform:

receiving a session set-up message from a mobile station to a call state control function;

determining inter-system handover support of the mobile station in said call state control function;

providing said session set-up message to a first call control node in response to said inter-system handover support of said mobile station;

requesting an allocation of a first media gateway from said first call control node;

receiving a handover request to said first call control node from said mobile station via said call state control function;

determining in said first call control node an identity of a second call control node based on cell information in said handover request;

sending the handover request from said first call control node to said second call control node;

receiving a handover number to said first call control node from said second call control node in response to said handover request;

routing a handover session from said first call control node to said second call control node using said handover number;

receiving an answer message to said first call control node from said second call control node;

receiving a handover completion message to said first call control node from said call state control function; and requesting a removing of at least one packet switched media bearer from said media gateway.

30. The computer program according to claim 29, wherein said computer readable medium is a removable memory card.

31. The computer program according to claim 29, wherein said computer readable medium is a magnetic or an optical disk.

32. An apparatus, comprising:
- set-up receiving means for receiving a session set-up message from a mobile station to a call state control function;
- determining means for determining inter-system handover support of the mobile station in said call state control function;
- sending means for providing said session set-up message to a first call control node in response to said inter-system handover support of said mobile station;
- allocation means for requesting an allocation of a first media gateway from said first call control node;
- receiving means for receiving a handover request to said first call control node from said mobile station via said call state control function;
- determining means for determining in said first call control node an identity of a second call control node based on cell information in said handover request;
- handover request means for sending the handover request from said first call control node to said second call control node;
- routing information receiving means for receiving a handover number to said first call control node from said second call control node in response to said handover request;
- routing means for routing a handover session from said first call control node to said second call control node using said handover number;
- answer means receiving an answer message to said first call control node from said second call control node;
- handover completion means for receiving a handover completion message to said first call control node from said call state control function; and
- removal requesting means for requesting a removing of at least one packet switched media bearer from said media gateway.

* * * * *